(12) United States Patent
Viswanath et al.

(10) Patent No.: US 10,977,502 B2
(45) Date of Patent: *Apr. 13, 2021

(54) ESTIMATION OF TIME TO COLLISION IN A COMPUTER VISION SYSTEM

(71) Applicant: Texas Instruments Incorporated, Dallas, TX (US)

(72) Inventors: Prashanth Ramanathpur Viswanath, Bangalore (IN); Deepak Kumar Poddar, Bangalore (IN); Soyeb Nagori, Bangalore (IN); Manu Mathew, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,415

(22) Filed: Feb. 11, 2019

(65) Prior Publication Data

US 2020/0026933 A1 Jan. 23, 2020

Related U.S. Application Data

(63) Continuation of application No. 15/298,218, filed on Oct. 19, 2016, now Pat. No. 10,248,872.

(51) Int. Cl.
*G06K 9/00* (2006.01)
*G06T 7/73* (2017.01)
*G06T 7/246* (2017.01)

(52) U.S. Cl.
CPC ......... *G06K 9/00805* (2013.01); *G06T 7/248* (2017.01); *G06T 7/74* (2017.01);
(Continued)

(58) Field of Classification Search
None
See application file for complete search history.

(56) References Cited

U.S. PATENT DOCUMENTS 7,495,550 B2    2/2009  Huang et al.
10,248,872 B2 * 4/2019  Viswanath ......... G06K 9/00805
(Continued)

FOREIGN PATENT DOCUMENTS

CN    102997900A A    3/2013

OTHER PUBLICATIONS

Timothy L. Brown, "Adjusted Minimum Time-To-Collision (TTC): A Robust Approach to Evaluating Crash Scenarios", Driving Simulation Conference, North America 2005, Orlando, FL, Nov. 2005, pp. 40-49.
Andreas Eidehall, et al, "Toward Autonomous Collision Avoidance by Steering", IEEE Transactions on Intelligent Transportation Systems, vol. 8, No. 1, Mar. 2007, pp. 84-94.
(Continued)

*Primary Examiner* — Justin P. Misleh
(74) *Attorney, Agent, or Firm* — Ebby Abraham; Charles A. Brill; Frank D. Cimino

(57) ABSTRACT

A method for estimating time to collision (TTC) of a detected object in a computer vision system is provided that includes determining a three dimensional (3D) position of a camera in the computer vision system, determining a 3D position of the detected object based on a 2D position of the detected object in an image captured by the camera and an estimated ground plane corresponding to the image, computing a relative 3D position of the camera, a velocity of the relative 3D position, and an acceleration of the relative 3D position based on the 3D position of the camera and the 3D position of the detected object, wherein the relative 3D position of the camera is relative to the 3D position of the detected object, and computing the TTC of the detected object based on the relative 3D position, the velocity, and the acceleration.

20 Claims, 3 Drawing Sheets

(52) U.S. Cl.
CPC .............. *G06T 2207/30241* (2013.01); *G06T 2207/30261* (2013.01)

(56) References Cited

U.S. PATENT DOCUMENTS

| | | | |
|---|---|---|---|
| 2009/0192710 A1* | 7/2009 | Eidehall ............. | B62D 15/0265 701/301 |
| 2010/0305857 A1 | 12/2010 | Byrne et al. | |
| 2011/0246156 A1 | 10/2011 | Zecha et al. | |
| 2013/0073194 A1 | 3/2013 | Nakamura et al. | |
| 2014/0037138 A1 | 2/2014 | Sato et al. | |
| 2014/0297171 A1 | 10/2014 | Minemura et al. | |
| 2015/0117709 A1* | 4/2015 | Chandraker ....... | G06K 9/00791 382/103 |
| 2015/0219756 A1 | 8/2015 | Ishimori | |
| 2015/0254834 A1* | 9/2015 | Chandraker .............. | G06T 7/70 382/154 |
| 2015/0334269 A1 | 11/2015 | Yokota et al. | |
| 2016/0101779 A1 | 4/2016 | Katoh | |
| 2016/0247030 A1* | 8/2016 | Matsumoto ............... | B60R 1/00 |
| 2017/0210360 A1* | 7/2017 | Ito ............................. | B60T 7/22 |
| 2017/0220874 A1 | 8/2017 | Ayvaci et al. | |
| 2017/0349169 A1 | 12/2017 | Deshpande | |
| 2018/0366001 A1* | 12/2018 | Matsunaga ....... | B60W 30/0956 |

OTHER PUBLICATIONS

John D. Lee, et al, "Collision Warning Timing, Driver Distraction, and Driver Response to Imminent Rear-End Collisions in a High-Fidelity Driving Simulator", Human Factors, vol. 44, No. 2, Summer 2002, pp. 314-334.

Jonas Jansson, "Collision Avoidance Theory with Application to Automotive Collision Mitigation", Linkoping Studies in Science and Technology, Dissertations, No. 950, pp. 1-188.

David N. Lee, "A Theory of Visual Control of Braking Based on Information about Time-to-Collision", Perception, vol. 5, 1976, pp. 437-459.

"TDA3x SoC Processors for Advanced Driver Assist Systems (ADAS) Technical Brief", Texas Instruments, Inc., SPRT704A, Oct. 2014, pp. 1-6.

Erez Dagan, et al, "Forward Collision Warning with a Single Camera", 2004 IEEE Intelligent Vehicles Symposium, Parma, Italy, Jun. 14-17, 2004, pp. 1-6.

Eric Raphael et al, "Development of a Camera-Based Forward Collision Alert System", SAE International, 2011-01-0579, Apr. 12, 2011, pp. 1-12.

Mihir Mody et al, "High Performance Front Camera ADAS Applications on TI's TDA3X Platform", 2015 IEEE 22nd International Conference on High Performance Computing (HiPC), Bangalore, KA, India, Dec. 16-19, 2015, pp. 1-8.

Notification of First CN Office Action; PRC (China) Pat. Appln. No. 201710971461.7; dated Dec. 27, 2020; 1page.

First CN Office Action; PRC (China) Pat. Appln. No. 201710971461.7; dated Dec. 27, 2020.

* cited by examiner

ESTIMATION OF TIME TO COLLISION IN A COMPUTER VISION SYSTEM

CROSS-REFERENCE TO RELATED APPLICATION(S)

This continuation application claims priority to U.S. patent application Ser. No. 15/298,218, filed Oct. 19, 2016, which is hereby incorporated herein by reference.

BACKGROUND OF THE DISCLOSURE

Field of the Disclosure

Embodiments of the present disclosure generally relate to a computer vision system, and more specifically relate to estimation of time to collision in a computer vision system.

Description of the Related Art

The estimated time to collision (TTC) is important information in Advanced Driver Assistance Systems (ADAS) and Autonomous Driving since TTC is used in safety critical applications such as Forward Collision Warning (FCW), Automatic Emergency Braking (AEB), and Automatic Cruise Control (ACC). TTC may be defined as the time taken for an object to collide with an obstacle in the path of the object, or, in the case of a moving vehicle, the estimated time until the vehicle will collide with an object in the trajectory of the vehicle. Many current approaches to computation of TTC are based on sensor modalities such as radar and Lidar. Lidar may be cost prohibitive for consumer vehicles and the angular resolution of radar may be poor.

SUMMARY

Embodiments of the present disclosure relate to estimation of time to collision in a computer vision system. In one aspect, a method for estimating time to collision (TTC) of a detected object in a computer vision system is provided that includes determining a three dimensional (3D) position of a camera in the computer vision system, determining a 3D position of the detected object based on a 2D position of the detected object in an image captured by the camera and an estimated ground plane corresponding to the image, computing a relative 3D position of the camera, a velocity of the relative 3D position, and an acceleration of the relative 3D position based on the 3D position of the camera and the 3D position of the detected object, wherein the relative 3D position of the camera is relative to the 3D position of the detected object, and computing the TTC of the detected object based on the relative 3D position, the velocity, and the acceleration.

In one aspect, a computer vision system is provided that includes a monocular camera configured to capture a two dimensional (2D) image of a scene, an object detection component configured to detect objects in the 2D image, and a time to collision (TTC) component configured to estimate TTC for an object detected by the object detection component, wherein the TTC component is configured to determine a three dimensional (3D) position of the camera corresponding to the 2D image, determine a 3D position of the detected object based on a 2D position of the detected object in the image and an estimated ground plane corresponding to the image, compute a relative 3D position of the camera, a velocity of the relative 3D position, and an acceleration of the relative 3D position based on the 3D position of the camera and the 3D position of the detected object, wherein the relative 3D position of the camera is relative to the 3D position of the detected object, and compute the TTC of the detected object based on the relative 3D position, the velocity, and the acceleration.

In one aspect, a method for estimating time to collision (TTC) of a detected object in a computer vision system is provided that includes computing a distance of the detected object from a camera comprised in the computer vision system, wherein the detected object is in a field of view of the camera, computing a projected velocity of a relative three dimensional (3D) position of the camera in a direction of the detected object, wherein the relative 3D position of the camera is relative to a 3D position of the detected object, computing a projected acceleration of the relative 3D position of the camera in the direction of the detected object, and computing the TTC based on the distance, the projected velocity, and the projected acceleration.

In one aspect, a method for determining whether or not a detected object is in a trajectory of a vehicle is provided that includes determining an angle of approach of the detected object, wherein the angle of approach is an angle between a velocity vector of a camera comprised in the vehicle and a camera-to-object vector, wherein the detected object is in a field of view of the camera, and comparing the angle of approach to an angle threshold to determine if the detected object is in the trajectory.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
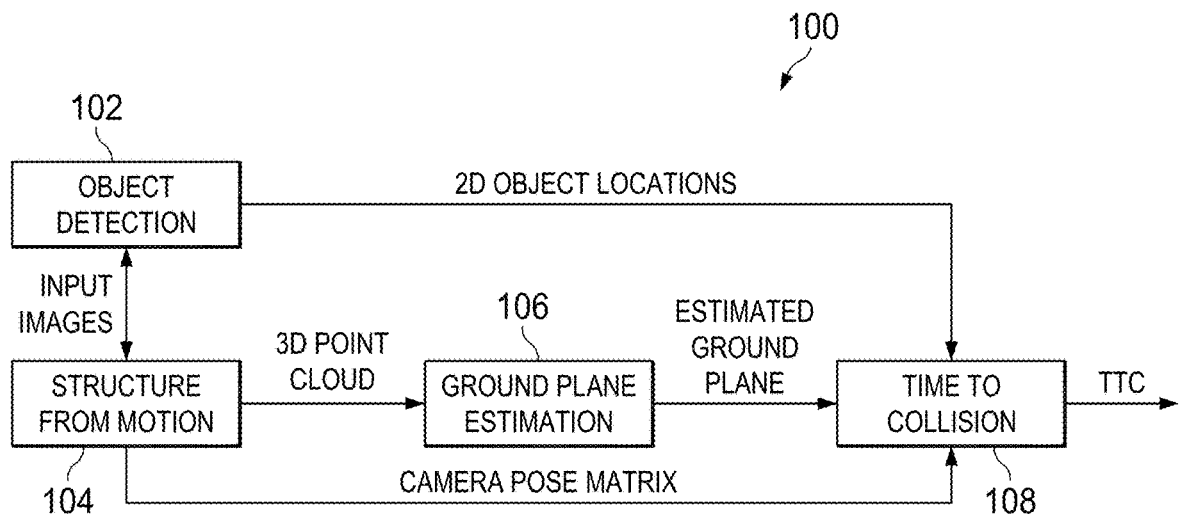
FIG. 1 is a block diagram of a system for estimating time to collision (TTC)

Specific embodiments of the disclosure will now be described in detail with reference to the accompanying figures. Like elements in the various figures are denoted by like reference numerals for consistency.

Embodiments of the disclosure provide for estimating the time to collision (TTC) of moving vehicle with an object in the trajectory of the vehicle based on frames captured by a front facing monocular camera installed on the vehicle. More specifically, TTC is estimated using information such as the distance of detected objects from the vehicle, the relative acceleration and velocity of the detected objects, and whether or not any of the detected objects are in the path of collision, i.e., in the trajectory of the vehicle.

FIG. 1 is a block diagram of a system 100 for estimating TTC. Inputs to the system 100 are images captured by a front facing monocular camera (not shown) installed in a vehicle. The system 100 includes an object detection component 102, a structure from motion (SfM) component 104, a ground plane estimation component 106, and a time to collision (TTC) component 108.

The object detection component 102 is coupled to the camera to receive the images. The object detection component 102 is configured to detect objects in the field of view (FOV) of the camera in each input image and to output for each detected object a bounding box indicating the two dimensional (2D) position in the image and a unique identifier. The object detection component 102 may use any suitable real time object detection technique. In some embodiments, the objection detection component 102 is configured to detect vehicles and pedestrians in the FOV.

The SfM component 104 is coupled to the camera to receive the images. The SfM component 104 is configured to generate a three dimensional (3D) point cloud representative of the 3D environment in the FOV of the camera corresponding to each input image. The SfM component 104 is further configured to generate a camera pose matrix as part generating the 3D point cloud. As is well known, a camera pose matrix is a 4×4 matrix that includes a 3×3 rotation matrix indicating how much the camera has rotated in 6 degrees of freedom and a translation vector indicating how much the camera has moved in the x, y, and z directions. The camera pose matrix generated by the SfM component 104 is a relative pose matrix indicating any changes in translation and rotation of the camera from the previous image. The SfM component 104 may use any suitable real time SfM technique. Examples of suitable SfM techniques may be found, for example, in U.S. patent application Ser. No. 15/197,749, "Method and System for Real Time Structure from Motion in a Computer Vision System," filed Jun. 20, 2016, which is incorporated by reference herein.

The ground plane estimation component 106 is coupled to the SfM component 106 to receive the 3D point cloud. The ground plane estimation component 106 is configured to estimate the ground plane based on the 3D point cloud. The ground plane estimation component 106 may use any suitable real time ground plane estimation technique. Examples of suitable ground plane estimation techniques may be found, for example, in U.S. patent application Ser. No. 15/255,832, "Ground Plane Estimation in a Computer Vision System," filed Sep. 2, 2016, which is incorporated by reference herein.

The TTC component 108 is coupled to the object detection component 102 to receive the bounding boxes and identifiers of the detected objects, to the SfM component 104 to receive the camera pose matrix, and to the ground plane estimation component 106 to receive the estimated ground plane. The TTC component 108 is configured to estimate the TTC of an object in the trajectory of the vehicle using the received information. Operation of the TTC component 108 is explained in reference to the methods of FIG. 2 and FIG. 3.

Figure 2:
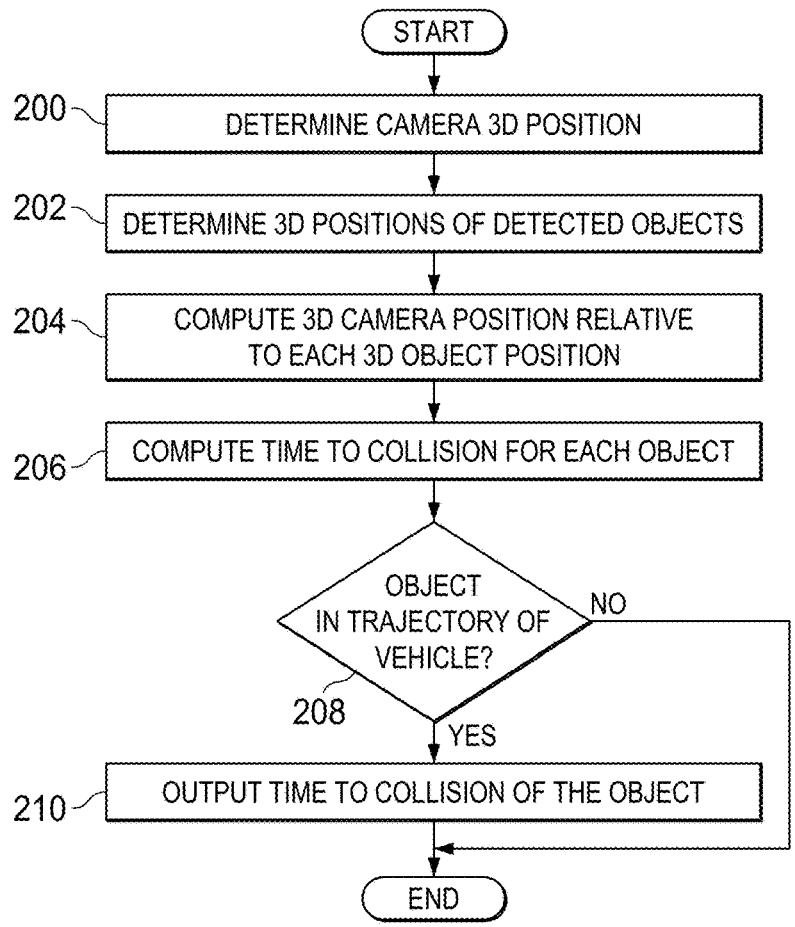
FIG. 2 is a flow diagram of a method for computing the estimated TTC in the system of FIG. 1.

FIG. 2 is a flow diagram of a method for estimating the TTC that may be performed by the TTC component 108 in the system of FIG. 1. Initially, the 3D position of the camera is determined 200 based on the camera pose matrix received from the SfM component 104. To determine the 3D position of the camera, the translation vector is extracted from the camera pose matrix. As previously mentioned, the translation vector includes the changes to the X, Y, and Z coordinates of the camera relative to the previous image. The absolute camera position $[X_c, Y_c, Z_c]$ is obtained using the previous and the current translation vectors. The camera position is provided to a Kalman filter configured for tracking the camera position as there may be errors in the camera pose due to reliance on camera images to compute the camera pose matrix. The Kalman filter is a constant acceleration model in which the output measurements are predicted based on constant acceleration. The outputs of the Kalman filter are a filtered camera position $[X_c, Y_c, Z_c]'$, a velocity vector $[Vx_c, Vy_c, Vz_c]$ indicating the rate of change of position (velocity) of the camera, and an acceleration vector $[Ax_c, Ay_c, Az_c]$ indicating the rate of change of velocity (acceleration) of the camera.

The 3D positions of the detected objects are also determined 202 for each of the detected objects received from the object detection component 102. As previously mentioned, the object detection component 102 outputs a unique identifier and a bounding box for each detected object. Each bounding box is represented by the 2D coordinates of the corners of the bounding box. For purposes of determining the 3D position of a detected object, the 2D coordinates of the midpoint of the bottom of the corresponding bounding box are used for the 2D position of the object as the bottom of a bounding box is supposed to be on the ground plane.

The 3D position on the ground of a detected object is computed using the above described 2D position at the bottom of the corresponding bounding box and the ground plane equation provided by the ground plane estimation component 106. The ground plane equation for an image is in the form AX+BY+CZ=1 where A, B, and C are the coefficients of the ground plane determined by the ground plane estimation component 106 and X, Y, and Z are 3D coordinates. The 3D position of a detected object having 2D coordinates x, y is computed by solving the following three equations to determine X, Y, and Z for the object:

$$AX+BY+CZ=1$$

$$Xf/Z=x$$

$$Yf/Z=y$$

where f is the focal length which is given (pin-hole camera model).

Because the bounding boxes for detected objects may jump from image to image and/or may not cover the bottom of an object where the object intersects the ground, each 3D object position $[X_o, Y_o, Z_o]$ is tracked using a Kalman filter to reduce noise. Each of the Kalman filters is a constant acceleration model in which the output measurements are predicted based on constant acceleration. The outputs of each Kalman filter are a filtered 3D position of the object $[X_o, Y_o, Z_o]'$, a velocity vector $[Vx_o, Vy_o, Vz_o]$ indicating the rate of change of position (velocity) of the object, and an acceleration vector $[Ax_o, Ay_o, Az_o]$ indicating the rate of change of velocity (acceleration) of the object.

Because the estimated ground plane coefficients [A,B,C] may also be erroneous, the coefficients are also tracked using a Kalman filter. The Kalman filter is a constant velocity model in which the output measurements are predicted based on constant velocity. The outputs of the Kalman filter are filtered coefficients [A,B,C]' and a velocity vector $[V_A, V_B, V_C]$ indicating the rate of change (velocity) of the coefficients. The Kalman filter may be applied by either the ground plane estimation component 106 or the TTC component 108.

The 3D camera position relative to each 3D object position is then computed 204. That is, for each detected object, the filtered 3D position of the object $[X_o, Y_o, Z_o]'$ is subtracted from the filtered 3D camera position $[X_c, Y_c, Z_c]'$ to determine the 3D position of the camera relative to the 3D object position $[X_r, Y_r, Z_r]$. Each of the relative positions $[X_r, Y_r, Z_r]$ is tracked using a Kalman filter. Each of the Kalman filters is a constant acceleration model in which the output measurements are predicted based on constant acceleration. The outputs of each Kalman filter are a filtered 3D relative position $[X_r,Y_r,Z_r]'$, a velocity vector $[Vx_r,Vy_r,Vz_r]$ indicating the rate of change of the 3D relative position (velocity), and an acceleration vector $[Ax_r,Ay_r,Az_r]$ indicating the rate of change of velocity (acceleration) of the 3D relative position.

The time to collision (TTC) for each detected object is then computed based on the filtered 3D relative position $[X_r,Y_r,Z_r]'$, the velocity vector $[Vx_r,Vy_r,Vz_r]$, and the acceleration vector $[Ax_r,Ay_r,Az_r]$ corresponding to the object. Computation of the TTC for an object is described below in reference to the method of FIG. 3.

The trajectories of each of the detected objects are also checked 208 to determine if any object is in the trajectory of the vehicle. If none of the detected objects are in the trajectory of the vehicle, the method terminates. If any object is determined to be in the trajectory of the vehicle, the TTC for that object is output 210 and the method terminates. A detected object is determined to be in the trajectory of the vehicle if the angle of approach θ of the object is less than a predetermined angle threshold. The angle of approach of a detected object may be determined by finding the angle between the camera velocity vector and the camera-to-object vector, as given by $$\theta = \text{absolute}(a\cos((u*v)/(\text{mod}(u)*\text{mod}(v))))$$

where u and v are the two vectors. Any suitable value for the angle threshold may be used and the value may be empirically determined. In some embodiments, the angle threshold value may be between 0 and 10 degrees. The angle threshold value may be based, for example, on the position of the camera and the expected lane width.

Because objects in the same lane closer to the camera have a higher variability in the angle of approach θ than objects in the same lane farther away from the camera, a distance based angle threshold approach may be used in some embodiments. The distance based angle threshold approach is based on the predetermined angle threshold value such that as the distance of the object from the camera increases, the angle threshold value is progressively reduced from the predetermined angle threshold value. Computation of the distance of an object from the camera is explained in reference to the method of FIG. 3.

For example, assume that the predetermined angle threshold value is 8 degrees. The distance based thresholding may be applied as follows. If the distance to the object is less than 3 meters, then the full span of the predetermined angle threshold, i.e., 8°, is used for the trajectory check. If the distance to the object is between three and six meters, then 75% of the predetermined angle threshold, i.e., 6°, is used for the trajectory check. If the distance to the object is between six and twelve meters, then 50% of the predetermined angle threshold, i.e., 4°, is used for the trajectory check. If the distance to the object is greater than twelve meters, then 25% of the predetermined angle threshold, i.e., 2°, is used for the trajectory check.

Any suitable distance ranges, number of distance ranges, and/or the amount of reduction of the predetermined angle threshold for each distance range may be used. The distance ranges, number of distance ranges, and/or amount of threshold reduction may be empirically determined.

Figure 4:
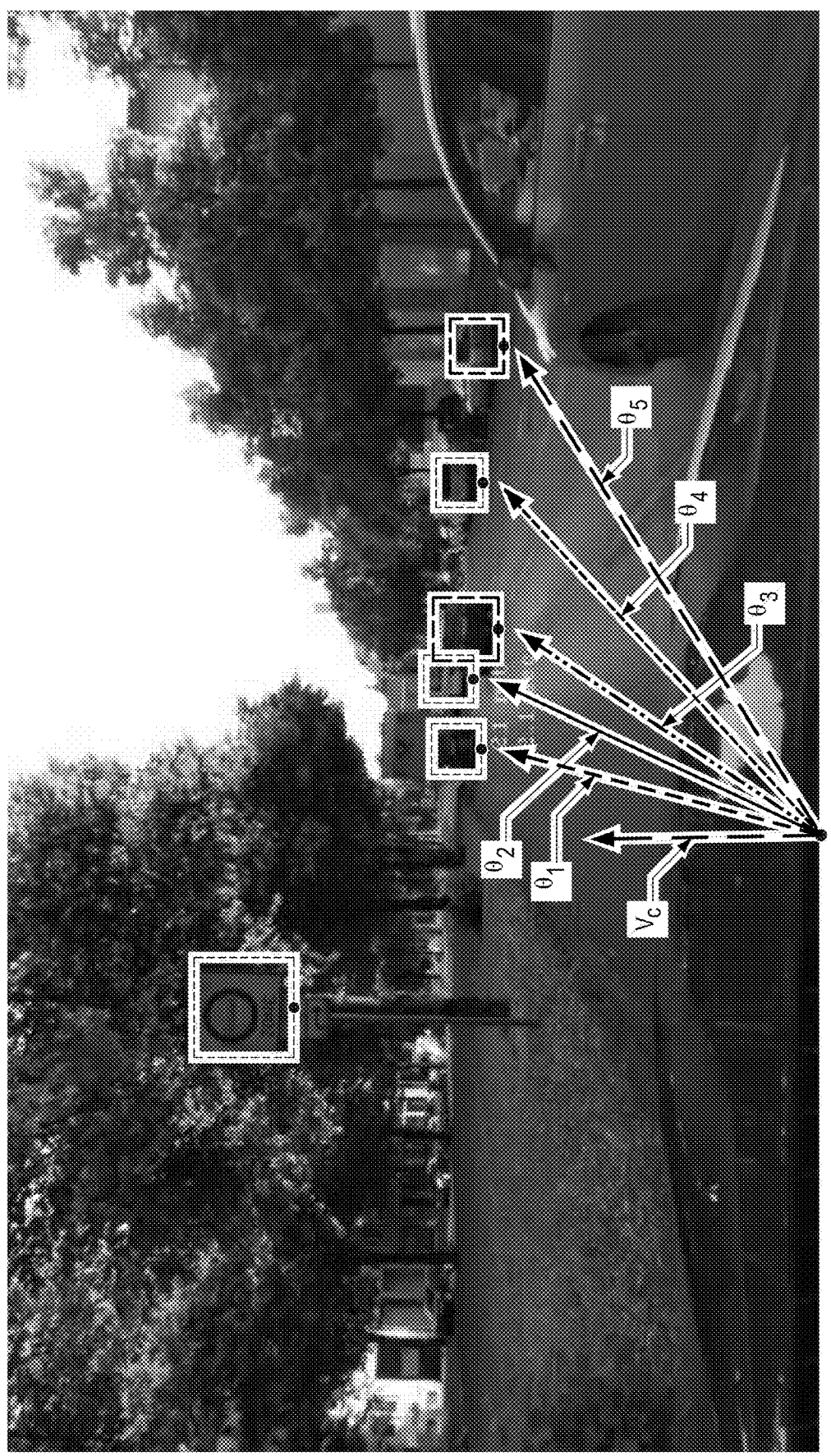
FIG. 4 is an example illustrating estimation of the trajectory of an object.

FIG. 4 is an example illustrating the distance based thresholding. In this example, as indicated by the bounding boxes, five objects have been detected on the ground. The camera-to-object vector for each object is shown by the arrow between the camera position and the object. The tracked camera velocity vector $V_c$ is also shown. As previously described, the angle of approach for each object is determined based on the camera velocity vector and the camera-to-object vector. In this example, only $\theta_1 <$ angle threshold, so only the object corresponding to this angle of approach is in the trajectory of the vehicle.

Figure 3:
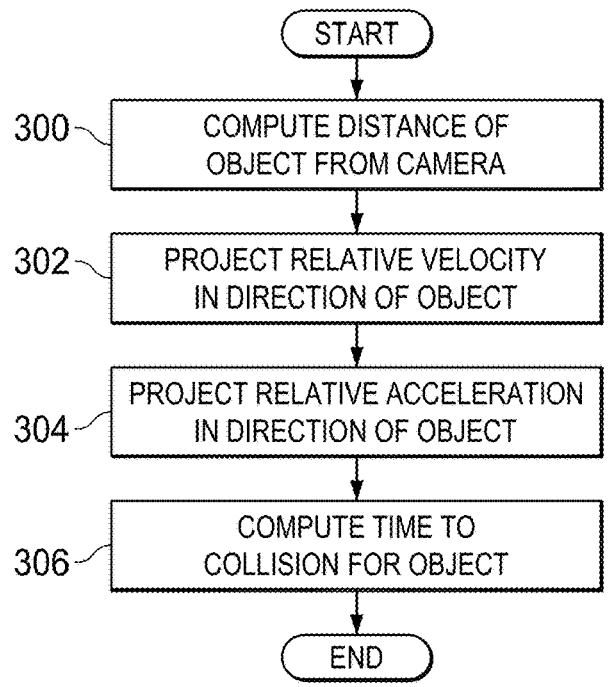
FIG. 3 is a flow diagram of a method for estimating the TTC of an object.

FIG. 3 is a flow diagram of a method for computing the time to collision for an object. The inputs to this method are the filtered 3D relative position $[X_r,Y_r,Z_r]'$, the velocity vector $[Vx_r,Vy_r,Vz_r]$, and the acceleration vector $[Ax_r,Ay_r,Az_r]$ corresponding to the object. Initially, the distance of the object from the camera is computed 300. The distance d may be computed as per $$d = \text{norm}([X_r,Y_r,Z_r]').$$

The relative velocity of the camera is also projected 302 in the direction of the object. The projected velocity v may be computed as per $$v = [Vx_r,Vy_r,Vz_r] \times ([X_r,Y_r,Z_r]'/\text{norm}([X_r,Y_r,Z_r]')).$$

Further, the relative acceleration of the camera is projected 304 in the direction of the object. The projected acceleration a may be computed as per $$a = [Ax_r,Ay_r,Az_r] \times ([X_r,Y_r,Z_r]'/\text{norm}([X_r,Y_r,Z_r]')).$$

The time to collision TTC is then computed as per
If a=0, TTC=d/v
Else, TTC=min[(−v (+−) sqrt($v^2$+2ad))/a].

Figure 5:
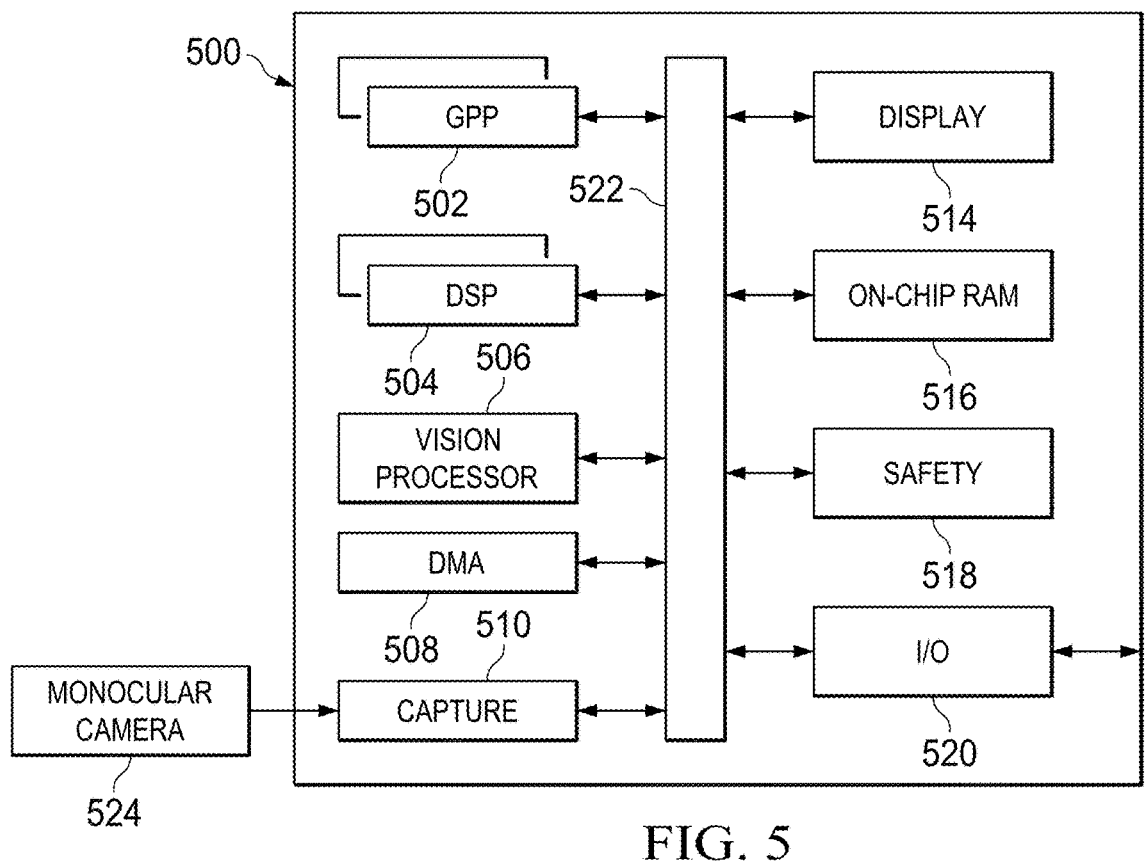
FIG. 5 is a high level block diagram of an example multiprocessor system-on-a-chip (SOC) configured for use in a monocular camera-based automotive safety application.

FIG. 5 is a high level block diagram of an example multiprocessor system-on-a-chip (SOC) 500 configured for use in a monocular camera-based ADAS. In particular, the example SOC 500 is an embodiment of the TDA3X SOC available from Texas Instruments, Inc. A high level description of the components of the SOC 500 is provided herein. More detailed descriptions of example components may be found in M. Mody, et al., "High Performance Front Camera ADAS Applications on TI's TDA3X Platform," Proceedings of 2015 IEEE $22^{nd}$ International Conference on High Performance Computing, Dec. 16-19, 2015, Bangalore, India, pp. 456-463, and "TDA3x SOC Processors for Advanced Driver Assist Systems (ADAS) Technical Brief," Texas Instruments, SPRT704A, October, 2014, pp. 1-6, which are incorporated by reference herein.

The SOC 500 includes dual general purpose processors (GPP) 502, dual digital signal processors (DSP) 504, and a vision processor 506 coupled via a high speed interconnect 522. The SOC 500 further includes a direct memory access (DMA) component 508, a camera capture component 510 coupled to a monocular camera 524, a display management component 514, on-chip random access (RAM) memory 516, e.g., a computer readable medium, and various input/output (I/O) peripherals 520 all coupled to the processors via the interconnect 522. In addition, the SOC 500 includes a safety component 518 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures. Software implementing estimation of time to collision as described herein may be stored in the memory 516 and may execute on one or more programmable processors of the SOC 500.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which TTC is computed for all detected objects. One of ordinary skill in the art will understand embodiments in which the TTC is computed only for the detected object in the trajectory of the vehicle.

In another example, embodiments have been described herein in which the camera pose matrix is a relative pose matrix indicating any changes in translation and rotation of the camera from the previous image. One of ordinary skill in the art will understand embodiments in which the camera pose matrix is computed with respect to the origin.

In another example, embodiments have been described herein in which the camera pose matrix is computed as part of determining a 3D point cloud. One of ordinary skill in the art will understand embodiment in which the camera pose is determined, for example, using an inertial measurement unit or the odometer of the vehicle.

In another example, embodiments have been described herein in which Kalman filters are used. One of ordinary skill in the art will understand embodiments in which other filter types are used, e.g., particle filters or mean averaging filters.

In another example, embodiments have been described herein in which the midpoint of the bottom of the bounding box of a detected object is used to as the 2D location of the detected object. One of ordinary skill in the art will understand embodiments in which other suitable locations along the bottom of the bounding box may be used. In such embodiments, the angle threshold used for the trajectory check may differ from that used when the midpoint location is used.

In another example, some embodiments have been described herein in which the detected objects are assumed to be other vehicles. One of ordinary skill in the art will understand embodiments in which the detected objects may include, for example, pedestrians, bicycles, and obstacles such as electric poles, road debris, etc.

In another example, embodiments have been described herein in reference to automotive safety systems. One of ordinary skill in the art will understand embodiments for other computer vision applications, such as, for example, industrial applications, robotics, and consumer applications such as vacuum cleaners. For example, TTC may be used to determine if there is anything wrong with objects moving on a conveyor belt. The relative velocity of objects moving on the conveyor belt can be computed using the same computational components described herein where the reference plane would be the conveyor belt rather than the ground plane.

As use herein, the term "vehicle" may also be applied to other types of devices, such as robots, industrial devices, consumer devices, etc., in which computation of TTC is beneficial.

In another example, embodiments have been described herein in which the TTC estimation is implemented as software instructions executed on processors in a multiprocessor SOC. One of ordinary skill in the art will understand that ground plane estimation may be implemented as any suitable combination of software, firmware, and hardware. For example, some of the functionality may be implemented in one or more hardware accelerators, application specific integrated circuits (ASICs), field-programmable gate arrays (FPGAs), etc.

Software instructions implementing all or portions of methods described herein may be initially stored in a computer-readable medium and loaded and executed by one or more processors. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method comprising:
   determining a three dimensional (3D) position of a camera in a computer system;
   determining a 3D position of an object based on a 2D position of the object in an image captured by the camera and an estimated ground plane corresponding to the image;
   computing a relative 3D position of the camera and a velocity of the relative 3D position based on the 3D position of the camera and the 3D position of the object, wherein the relative 3D position of the camera is relative to the 3D position of the object; and
   computing a time to collision of the object based on the relative 3D position and the velocity of the relative 3D position.

2. The method of claim 1, further comprising determining if the object is in a trajectory of a vehicle comprising the camera, the determining comprising comparing an angle of approach of the object to an angle threshold.

3. The method of claim 2, wherein comparing an angle of approach comprises comparing the angle of approach to an angle threshold determined based on a distance of the object from the camera.

4. The method of claim 3, wherein the angle threshold is a percentage of a predetermined angle threshold, wherein the percentage is decreased as the distance increases.

5. The method of claim 4, wherein comparing an angle of approach comprises:
comparing the angle of approach to the predetermined angle threshold if the distance is less than a first predetermined distance;
comparing the angle of approach to a first percentage of the predetermined angle threshold if the distance is between the first predetermined distance and a second predetermined distance, wherein the second predetermined distance is larger than the first predetermined distance;
comparing the angle of approach to a second percentage of the predetermined angle threshold if the distance is between the second predetermined distance and a third predetermined distance, wherein the third predetermined distance is larger than the second predetermined distance and the second percentage is larger than the first percentage; and
comparing the angle of approach to a third percentage of the predetermined angle threshold if the distance is greater than the third predetermined distance, wherein the third percentage is larger than the second percentage.

6. The method of claim 5, wherein the first percentage is 25%, the second percentage is 50%, and the third percentage is 75%.

7. The method of claim 1, wherein the 2D position of the object is a midpoint between bottom two corners of a bounding box corresponding to the object.

8. The method of claim 1, wherein the 3D position of the camera is determined from a camera pose matrix corresponding to the image.

9. The method of claim 1, wherein computing the TTC further comprises computing the TTC based on a projection of the velocity of the relative 3D position of the camera in a direction of the object.

10. A computer system comprising a processor; and a memory coupled to the processor comprising instructions executable by the processor, the processor being operable when executing the instructions to:
capture a two dimensional (2D) image of a scene by a camera;
determine a three dimensional (3D) position of the camera corresponding to the 2D image;
determine a 3D position of san object based on a 2D position of the object in the 2D image and an estimated ground plane corresponding to the 2D image;
compute a relative 3D position of the camera and a velocity of the relative 3D position based on the 3D position of the camera and the 3D position of the object, wherein the relative 3D position of the camera is relative to the 3D position of the object; and
compute a time to collision of the object based on the relative 3D position and the velocity of the relative 3D position.

11. The computer system of claim 10, wherein the processor is further operable when executing the instructions to determine if the object is in a trajectory of a vehicle comprising the camera, the determining comprising comparing an angle of approach of the object to an angle threshold.

12. The computer system of claim 11, wherein the processor is further operable when executing the instructions to compare the angle of approach to an angle threshold determined based on a distance of the object from the camera.

13. The computer system of claim 10, wherein the 2D position of the object is a midpoint between bottom two corners of a bounding box corresponding to the object.

14. The computer system of claim 10, wherein the processor is further operable when executing the instructions to generate a 3D point cloud corresponding to the 2D image.

15. The computer system of claim 14, wherein the processor is further operable when executing the instructions to generate the estimated ground plane based on the 3D point cloud.

16. The computer system of claim 10, wherein the processor is further operable when executing the instructions to compute the TTC based on a projection of the velocity of the relative 3D position of the camera in a direction of the object.

17. A method comprising:
computing a distance of an object from a camera in the computer system, wherein the object is in a field of view of the camera;
computing a projected velocity of a relative three dimensional (3D) position of the camera in a direction of the object, wherein the relative 3D position of the camera is relative to a 3D position of the object;
and
computing a time to collision based on the distance of the object and the projected velocity of the relative 3D position.

18. The method of claim 17, wherein computing the time to collision further comprises:
computing the time to collision as the distance divided by the projected velocity.

19. The method of claim 17, further comprising:
determining a 3D position of the camera;
determining the 3D position of the object based on a 2D position of the object in a two dimensional (2D) image captured by the camera and an estimated ground plane corresponding to the 2D image; and
computing the relative 3D position of the camera and a velocity of the relative 3D position based on the 3D position of the camera and the 3D position of the object, wherein the relative 3D position of the camera is relative to the 3D position of the object.

20. The method of claim 19, further comprising computing a projected acceleration of the object as a product of the relative 3D position of the camera and the acceleration of the relative 3D position divided by the distance.

* * * * *